United States Patent [19]

Hendry

[11] Patent Number: 5,212,795
[45] Date of Patent: May 18, 1993

[54] PROGRAMMABLE DMA CONTROLLER

[75] Inventor: David F. Hendry, Altadena, Calif.

[73] Assignee: California Institute of Technology, Pasadena, Calif.

[21] Appl. No.: 833,636

[22] Filed: Feb. 10, 1992

Related U.S. Application Data

[63] Continuation of Ser. No. 255,384, Oct. 11, 1988, abandoned.

[51] Int. Cl.$^5$ .................................................. G06F 13/18
[52] U.S. Cl. .......................... 395/725; 364/241.2; 364/242.3; 364/242.6; 364/941.0
[58] Field of Search ................ 395/725, 425, 325, 800

[56] References Cited

U.S. PATENT DOCUMENTS

| | | | |
|---|---|---|---|
| 4,067,059 | 1/1978 | Derchak | 364/200 |
| 4,075,691 | 2/1978 | Davis et al. | 364/200 |
| 4,371,932 | 2/1983 | Dinwiddie | 364/200 |
| 4,603,383 | 7/1986 | Tanaka et al. | 364/200 |
| 4,716,523 | 12/1987 | Burrus et al. | 364/200 |

*Primary Examiner*—David Y. Eng
*Attorney, Agent, or Firm*—Robert M. Wallace

[57] ABSTRACT

In a data system having a memory, plural input/output (I/O) devices and a bus connecting each of the I/O devices to the memory, a direct memory access (DMA) controller regulating access of each of the I/O devices to the bus, including a priority register storing priorities of bus access requests from the I/O devices, an interrupt register storing bus access requests of the I/O devices, a resolver for selecting one of the I/O devices to have access to the bus, a pointer register storing addresses of locations in the memory for communication with the one I/O device via the bus, a sequence register storing an address of a location in the memory containing a channel program instruction which is to be executed next, an ALU for incrementing and decrementing addresses stored in the pointer register, computing the next address to be stored in the sequence register, computing an initial contents of each of the register. The memory contains a sequence of channel program instructions defining a set up operation wherein the contents of each of the registers in the channel register is initialized in accordance with the initial contents computed by the ALU and an access operation wherein data is transferred on the bus between a location in the memory whose address is currently stored in the pointer register and the one I/O device enabled by the resolver.

14 Claims, 5 Drawing Sheets

FIG. 4

| 15 | 8 | 7 3 | 2 1 0 |
|---|---|---|---|
| 00000000 | | RRRRR | CC 0 |

└─ CHANNEL (0–3)
└─ REGISTER NUMBER (0–31)

FIG. 5

| | 15 | 14 | 0 |
|---|---|---|---|
| | 1 | 1 | 00000001 00111 | SOURCE WORD |
| | x | 1 | 00010010000001 | REGISTER BEFORE TRANSFER |
| | x | 1 | 10010010000111 | REGISTER AFTER TRANSFER |

FIG. 6

| 15 | 10 | 6 | 3 2 1 0 |
|---|---|---|---|
| xxxx | 11111 | xx | S E P D |

└─ INTERNAL STATUS
└─ STATUS BITS

FIG. 7

| 15 | 14 | 11 | 3 2 1 0 | 3 2 1 0 |
|---|---|---|---|---|
| x | HHHH | xxxxxx | S E P D | |

└─ HIT BITS
└─ CHANNEL NUMBER

FIG. 8

| 15 12 | 11 8 | 7 4 | 3 0 |
|---|---|---|---|
| vvv | vvv | vvv | vvv |
| 3 | 2 | 1 | 0 |

└─ ON-CHIP CHANNELS

FIG. 9

| 11 | 8 7 | 4 3 | 0 |
|---|---|---|---|
| xxxx | vvv | vvv | vvv |

└─ DATN
└─ AREQ[1]
└─ AREQ[0]

PROGRAMMABLE DMA CONTROLLER

ORIGIN OF THE INVENTION

The invention described herein was made in the performance of work under a NASA contract, and is subject to the provisions of Public Law 96-517 (35 USC 202) in which the Contractor has elected to retain title.

This application is a continuation of Ser. No. 255,384 filed Oct. 11, 1988, now abandoned.

TECHNICAL FIELD

The invention relates to computer systems and, more particularly, to means for asserting and relinquishing control to and from a central processing unit (CPU) from and to a direct memory access controller (DMAC) for priority performance of selected computer functions including means for determination of a time interval that such assertion of control may continue or be delayed. More particularly, the invention relates to a DMAC which features:

Autonomous operation wherein the CPU is not essential and the DMAC includes programming and decision-making capability as well as self-starting and initialization capability.

Bus resource control (Bandwidth, Priority, Burst) available on an individual channel basis.

Inter-channel process communication allowing the starting and stopping of processes and message interchange.

Specifically, the invention is a direct memory access controller (DMAC) for controlling the use of a bus interconnecting a central processing unit (CPU), a system memory, and an input/output device comprising, external bus interface portion means for providing an interface with the bus whose use is being controlled by the DMAC; pointer portion means containing a set of registers for each of a plurality of channels supported by the DMAC and including a next instruction address (NIA) register for computing the next address to have access to the bus; channel selection portion means for selecting which of the channels goes next and including registers for holding priority parameters for respective ones of the channels; repetition counter portion means including registers for counting individual pieces of data being transfered as part of an extended block of data and for determining when the entire the block of data has been transfered; state op-code portion means for obtaining the next instruction from the memory using an addresses thereof contained in the NIA register maintained by the pointer portion means and thereby controlling the sequence of operation of the DMAC; arithmetic and logic (ALU) portion means for performing arithmetic and logic operations as necessary to the functioning of the DMAC; global bus means for interconnecting all the foregoing portion means to permit global data transfer therebetween; and, timing and control portion means and address declaration portion means connected to all the foregoing portion means for providing timing and addressing operational support inputs to the foregoing portion means.

In the preferred embodiment, the arithmetic and logic portion means includes means for performing programmable associative functions in the obtaining of data from the memory.

Further in the preferred embodiment, the DMAC employs four identical independent channels and includes priority controller means incorporated therein for resolving conflicts arising from simultaneous requests by the channels for access to the bus, the priority controller means including programmable channel priority designation means for changeably determining the priority parameters to be associated with respective ones of the channels at any particular time. Additionally, each channel has a pair of handshake lines, *DREQ and *DACK, associated therewith wherein when a channel is to drive an I/O device, its the lines are connected to the device, the device asserts *DREQ when it needs service, and the channel asserts *DACK when the device is allowed access to the bus.

Also in the preferred embodiment, the DMAC includes first logic for accepting programming thereof in a passive mode by the writing of appropriate values to registers thereof and the DMAC includes second logic for accepting programming thereof in an active mode by the writing first of command records in the memory by the CPU and the writing second of certain ones of the registers in the passive mode to initialize and start the DMAC.

The preferred DMAC includes the capability of starting itself if there is no CPU in the system by additionally comprising, means for always granting the DMAC control of the bus at startup; means for initializing the registers of the DMAC to preset values during a reset; and, means for causing the DMAC to execute a program at an initialization memory location of the memory at startup.

In the preferred DMAC, there is also an Interrupt Status Register (ISR) wherein each channel has an interrupt bit in the ISR and a set interrupt bit means that the channel corresponding thereto has a pending interrupt as well as logic means for setting the channel's bit in the ISR when a channel wishes to inform the CPU of an interrupt status to be associated therewith and for generating an external interrupt signal to the CPU whereby the CPU is informed of the existance of an interrupt associated with the DMAC but must read the ISR in order to determine which channels have interrupts pending. Additionally in the preferred embodiment, there is a Priority Control Register (PCR) wherein each channel has an assigned field in the ISR determining the priority to be associated with the channel at any time as well as logic means for granting access to the bus by the channels according to the priority designated for the channels in the PCR wherein, the PCR is addressably writable and can have the assigned fields thereof modified by the CPU or programs associated with each of the channels whereby both programs executing in the CPU and programs controlling the operation of the channels within the DMAC can dynamically assign and change the priorities associated with respective ones of the channels and devices connected thereto as necessary.

The preferred embodiment also includes a Global Control Register (GCR) containing fields for bus control including, a software controlled DMA inhibit bit which, when set to a 1, causes the DMAC to not acknowledge any requests and if written to by the DMAC itself, causes the DMAC to get off the bus at the end of the current bus cycle and a burst count (BC) being an unsigned value whose purpose is to decrease HOLD/HOLDA handshake overhead by giving the DMAC a reasonable number of bus cycles at one time as well as logic for causing the DMAC, when it is granted the bus, to keep it until there are no more requests or it has had the bus for BC cycles, whichever comes first. Additionally, there is a Bandwidth Ratio Factor Register (BWRFR) containing individually addressable and changable fields for bandwidth ratio control of the DMAC and the channels thereof in performing memory-only (auto-request) operations which do not have explicit service request signals associated therewith wherein the channel must decide for itself when to issue a bus request, the BWRFR including an unsigned field for designating the Bandwidth Ratio Factor (BWRF) for each of the channels which determines the maximum frequency of their auto-requests wherein the bandwidth ratio is defined as:

$$BWR = \frac{b}{b+r} = \frac{b}{BWRD}$$

where b is the number of cycles that the bus is held by the channel and r is the number of cycles that it is released, if an auto-requesting channel is the only channel making a request in the burst then b is the burst value (BC) stored in the Global Control Register, the denominator BWRD has values in the set 1, 2, 4, ... 32768, and the BWRF value is the logarithm (base 2) of BWRD in the range 0–15; and, logic for allocating the maximum frequency of auto-requesting channels access to the bus according to their BWRF value and wherein a BWRF value of Zero results in a BWRD value of unity, which allows the channel to take the bus whenever it can get it whereby priority is handled at the global level to control latency (the maximum time that a channel has to wait after it has requested the bus before it is granted access) while bandwidth is controlled within each the channel itself and regulates the time between bus requests in the absence of another self-regulating mechanism.

The preferred DMAC also comprises, means associated with the system memory for including channel programs therein where a channel program is a sequence of commands associated with a channel and consisting of one or more program segments, each of which is made up of a number of load/store commands that set up channel registers and memory areas, and an access command that performs a channel operation repetitively; Sequence Address Register (SAR) means for pointing to a current command in a channel program, the SAR pointing to the first command in a segment when the segment is ready to be started; Command register means for receiving channel program commands; and, logic means for,

- when a command in a channel program has executed, copying the word in the system memory pointed to by the SAR means to the Command register means and decoding it, if a "skip" condition defined therein is not met, copying the next word (SAR +2) to whichever registers of the DMAC is appropriate for the command, incrementing the SAR to point to the next command, and executing the current command;
- when the command terminates, the repeating the step above:
- if the command loaded a new address into the SAR, branching to that address, otherwise, continuing with the next command;
- stepping through load/store commands until an access command is reached;
- deciphering an opcode field contained in the access command that defines the operation to be performed and a count field that defines the number of times the operation is to be repeated; and,
- performing the operation for the designated number of times.

BACKGROUND ART

In the field of digital computers, most, if not all, contemporary computer systems are built around a bus structure. All the elements are connected to the bus and all communications and transfer of data between the elements are conducted over the bus. The bus has the central processing unit (CPU) connected to it along with the random access memory (RAM) containing instructions and data as well as any peripheral devices, including input devices and output devices. In earlier computers, it was common to include a device controller in each of the peripheral devices. Such redundancy was not space- or cost-effective and, therefore, most computers in present use employ a direct memory access controller (DMAC) which controls the use of the bus for the entire system.

A typical prior art DMAC is dedicated to elementary operations on data blocks, such as copying one memory block to another, transferring data between memory and I/O devices, and comparing two memory blocks for equality. It performs such operations in one or two bus cycles per data item. These operations can be carried out by the CPU; but, they take several bus cycles per data item because of the overhead in counting loop executions and testing for completion. The use of a DMAC, therefore, gives the system a greater throughput. As is known and appreciated by those skilled in the art, this is the primary objective of such devices. Since all information (i.e., instructions, data, etc.) flows through the bus, it can become a bottleneck to the entire system proving the old adage of the "weakest link". No matter how fast the various devices can operate and perform their functions, system throughput ultimately grinds to the pace of the information transfer through the bus. Thus, optimizing bus usage is a primary system design objective.

A DMAC functions as a co-processor and bus master; that is, it takes control of the bus from the CPU when it has an operation to perform. It has its own control logic and bus drivers for reading and writing the control, address, and data lines. Since only one processor can drive the bus at a time, there must be an orderly method for transferring control between processors (i.e. the CPU and the DMAC). The HOLD/HOLDA protocol is typical of the prior art approach to this problem. When the DMAC wants the bus, it asserts the HOLD control signal (i.e., it drives it to the TRUE state). The CPU responds to HOLD by suspending operation, disconnecting most of its drivers from the bus, and asserting HOLDA (hold acknowledge) when that has been done. The CPU is idle as long as HOLD is asserted. The DMAC monitors the HOLDA signal and starts its operation when it sees the TRUE state (indicating that the CPU has come to an orderly halt and it through with the bus). When the DMAC has completed its operation, it disconnects from the bus, and de-asserts HOLD (i.e., drives it to the FALSE state). Upon seeing HOLD de-asserted, the CPU takes control of the bus once again and resumes operation.

It should be noted that typical prior art bus definitions require the CPU to give up the bus when HOLD is asserted, but they do not require the DMAC to give it back. There is, therefore, a danger that a DMAC process can keep the bus for a long time and "starve" other processes. A desirable objective in generating a DMAC specification, therefore, would be to provide some means for controlling the conditions and durations of its bus accesses. These could include a "burst" value, to determine the length of time that a process may control the bus during its current access, and a "latency" value, to determine the time that a DMA process has to wait, after releasing the bus, before its next bus access.

Typical prior art bus control chips contain four channels that execute independent processes. There is only a single bus interface for the chip, however, and, therefore, only one channel may be active at a time. Since the channel processes are independent, they compete for the bus. The chip must, therefore, include some sort of internal priority control mechanism. In the prior art, this is typically a hard-wired function. Likewise, if the system has more than one DMAC, the system itself must provide an overall priority control mechanism, such as a bus arbiter, to deal with simultaneous HOLD request from different DMAC chips.

In the prior art, there are typically two general types of DMA processes, distinguished by the way in which requests for bus access are generated. The first type is associated with asynchronous I/O operations (e.g., keyboard, printer, disk controller, etc.), the second with memory operations. An asynchronous device asserts a hardwired REQUEST signal to the channel when it has data to deliver or is ready to accept data. The channel responds by requesting bus access. When access is granted, the channel asserts ACKNOWLEDGE to the I/O device, which then reads or writes the bus. The notion of "data ready" does not apply meaningfully to memory, however—it is always ready. The decision to request bus access for a memory transfer must come from the channel itself. This second type of channel process has various names in DMA literature. For convenience only, it will be referred to as "auto-request" hereinafter.

Slow I/O devices do not need regulation of their demands on the system bus because they request service infrequently. Fast I/O devices and memory (auto-request) transfers, on the other hand, are capable of monopolizing the bus and, therefore, need some form of regulation.

In the prior art, the CPU is totally in charge of the system. It initializes the DMAC, sets up the channel processes, starts them, and handles events such as termination of a process and interrupts from a process. Such tasks are, of course, wasteful of CPU time that could be employed for computational purposes and, therefore, reduce overall system performance and throughput.

DMA processes typically involve one or two addresses. A separate bus cycle is needed for each address. Consequently, single-address processes take one bus cycle and double-address processes take two bus cycles. Advanced prior art DMA controllers provide additional functions such as comparing two memory blocks for equality and searching a memory block for a value. All may be classified as single- or double-address processes, however.

STATEMENT OF THE INVENTION

Accordingly, it is an object of the invention to provide a direct memory access controller having autonomous operation wherein the CPU is not essential and the DMAC includes programming and decision-making capability as well as self-starting and initialization capability.

It is another object of the invention to provide a direct memory access controller providing bus resource control (Bandwidth, Priority, Burst) available on an individual channel basis.

It is yet another object of the invention to provide a direct memory access controller providing inter-channel process communication allowing the starting and stopping of processes and message interchange.

It is still another object of the invention to provide a direct memory access controller providing an internal priority control mechanism which is not a hard-wired function and flexible in its application and operation.

Other objects and benefits of the invention will become apparent from the description which follows hereinafter when taken in conjunction with the drawing figures which accompany it.

BRIEF DESCRIPTION OF THE DRAWINGS

FIG. 4 is a drawing showing the register addressing implemented in the present invention in its tested embodiment.

FIG. 5 is a drawing showing the masked-write register loading scheme implemented in the present invention in its tested embodiment.

FIG. 6 is a drawing of the Channel Status Register employed in the present invention in its tested embodiment.

FIG. 7 is a drawing of the Interrupt Status Register employed in the present invention in its tested embodiment.

FIG. 8 is a drawing of the Priority Register employed in the present invention in its tested embodiment for on-chip channels.

FIG. 9 is a drawing of the Priority Register employed in the present invention in its tested embodiment for autonomous channels.

DETAILED DESCRIPTION OF THE INVENTION

Figure 1:
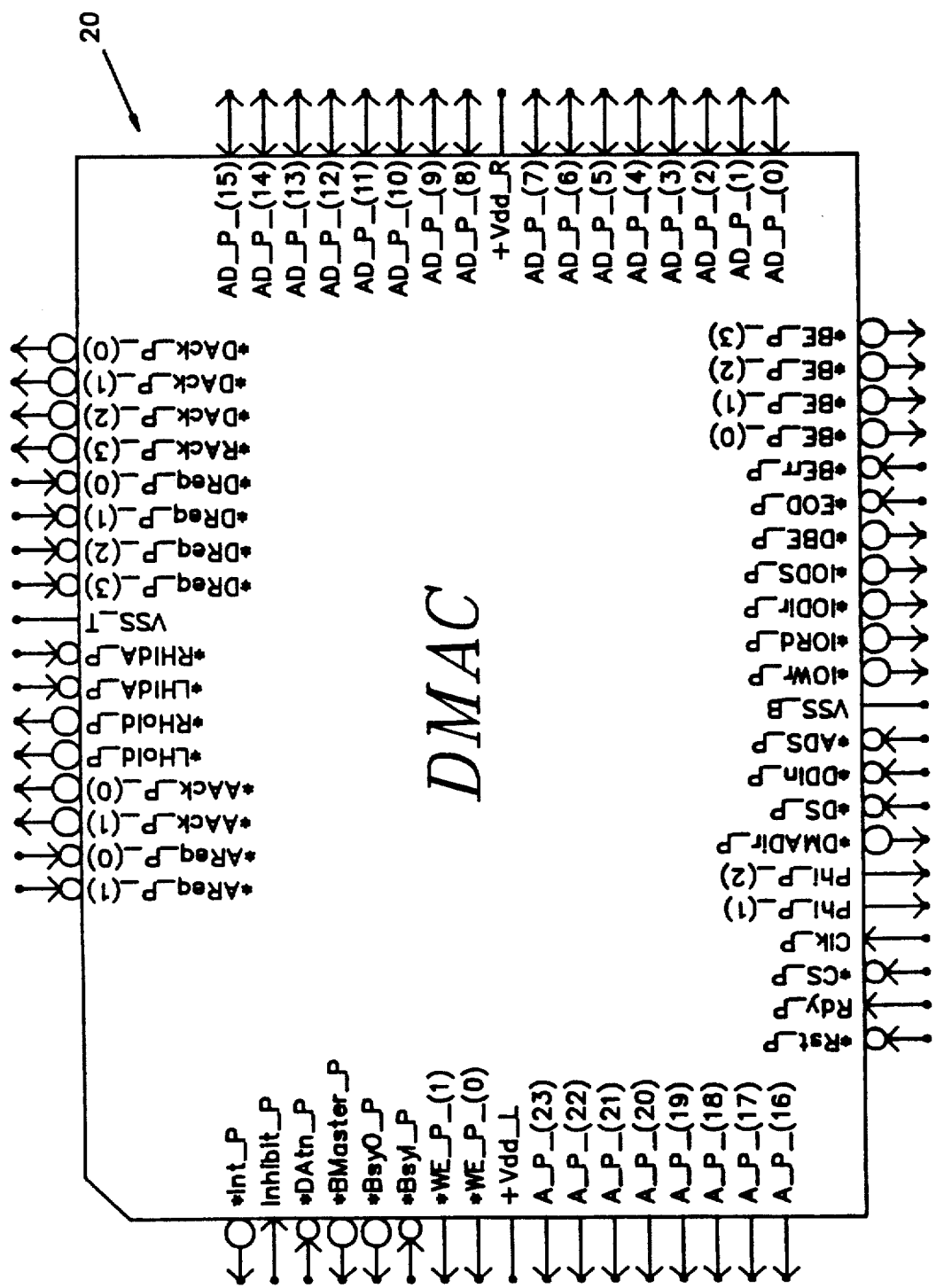
FIG. 1 is a drawing of the DMAC of the present invention as implemented in a single chip showing the connections thereto.

The present invention as described herein has been implemented and tested by the inventor in conjunction with a computer system located at the Jet Propulsion Laboratory (JPL). The overview of its implementation on a single chip is shown in FIG. 1 where it is designated as 20. All specifics provided herein are in relation to that tested embodiment. As is known and will be recognized by those skilled in the art, the broad aspects of novelty of the present invention are not limited by those specifics; and, persons implementing the present invention for use with a specific computer system will, and should, implement it in a way that best interfaces with the particular computer (i.e. CPU) employed as well as the memory and other devices connected thereto for operation therewith.

The DMAC 20 in its tested and implemented embodiment has been designed to work with the 32000 family of computers at JPL. The 32000 system defines a thirty-two bit address space, but only twenty-four address pins are provided in the 32016 and 32032 processors. The 32016 CPU has sixteen data bits while the 32032 CPU has thirty-two data bits.

Figure 2:
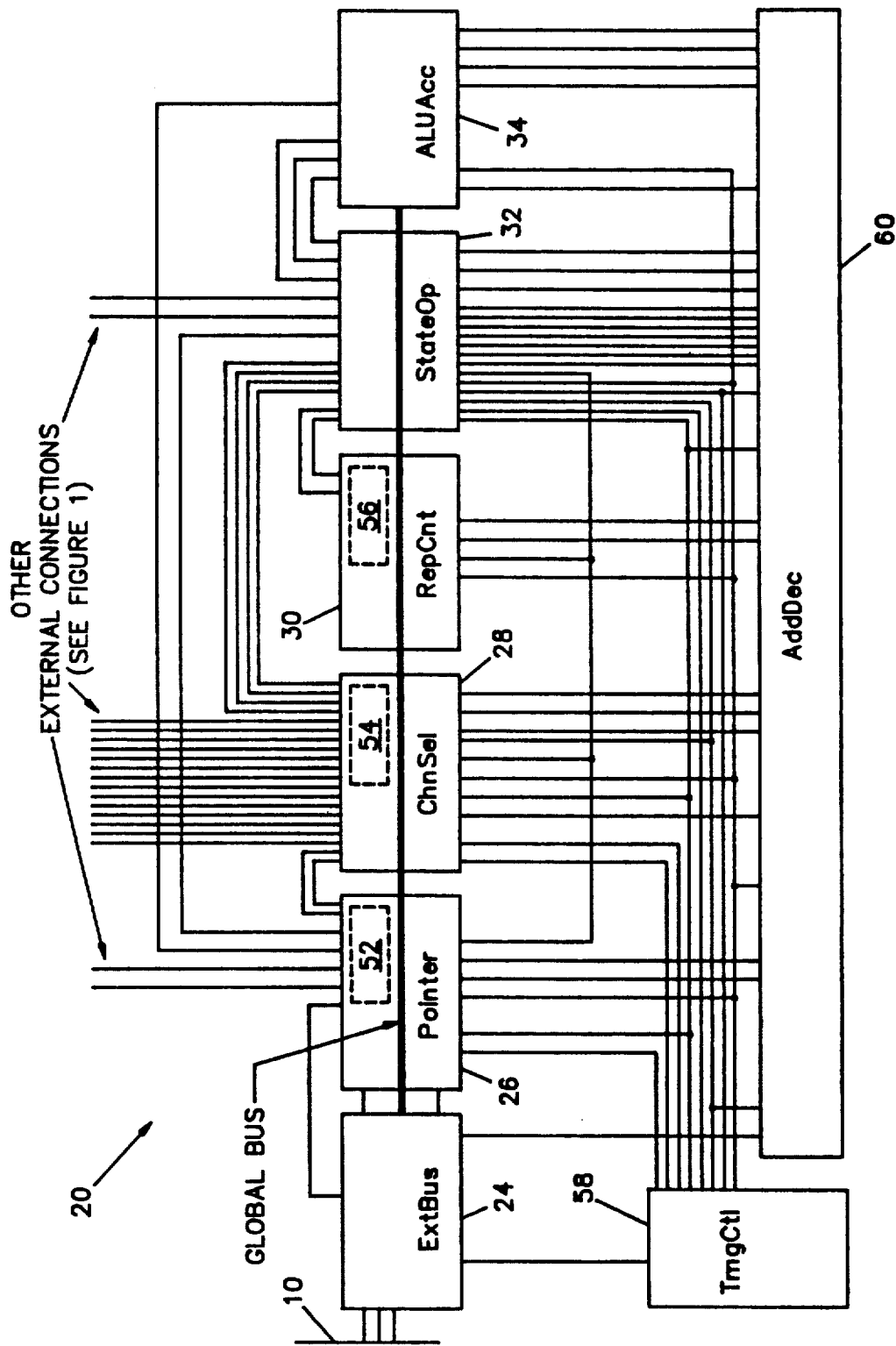
FIG. 2 is a functional block diagram of the DMAC of FIG. 1 showing the subcomponents thereof and their manner of interconnection.

As mentioned above, the DMAC 20 of the present invention has been implemented on a single chip and is shown in functional block diagram form in FIG. 2. The DMAC 20 comprises six sub-function blocks all operably connected to an internal global bus 22. There is an external bus interface block 24, a pointer block 26, a channel selection block 28, a repetition counter block 30, a state op-code block 32, and an arithmetic and logic block 34. Communication between the sub-function blocks is via the internal global bus 22 or direct connections, as is most appropriate in each case. There is also a timing and control block 58 and an address declaration block 60 connected to the remaining blocks for attending to the timing and addressing funtions of the DMAC 20 in the usual manner. The external bus interface block 24, of course, provides the interface for the DMAC 20 with the bus 10 whose use is being controlled thereby. The pointer block 26 contains registers 52 for each of four channels supported by the DMAC 20, including a next instruction address (NIA) register. Its main function is to compute the next address for access to the main system bus 10. The channel selection block 28 selects which channel (of the four) goes next. It includes registers 54 which hold priority parameters for the channels. The repetition counter block 30 includes registers 56 which are used to count block transfers for each channel; that is, when more than one piece of data is being transfered, the length of the block being transfered piece by piece is counted down by the logic of the repetition counter block 30 in its registers until it finds that the entire block of data has been transfered. The state op-code block 32 is the sequence controller for the DMAC 20. It obtains the next instruction via the NIA register maintained by the pointer block 26. The arithmetic and logic (ALU) block 34 performs arithmetic and logic operations as necessary to the functioning of the DMAC 20. While prior art DMACs have provided rudimentary logic and arithmetic functions, the arithmetic and logic block 34 of the present invention includes the capability to perform most typical ALU functions and, therefore, the DMAC 20 of the present invention is able to perform independently (i.e. without a CPU) and to perform associative functions in the obtaining of data not possible with prior art DMACs.

The DMAC 20 employs four identical independent channels. A priority controller incorporated therein resolves conflicts arising from simultaneous requests for bus access. Channel priorities are programmed, not hard wired. Each channel has a pair of handshake lines, *DREQ and *DACK [see, for example, *DReq__P(3-0) and *DAck__P93-0) in FIG. 1]. If the channel drives an I/O device, these lines are connected to it. The device asserts *DREQ when it needs service; the channel asserts *DACK when the device is allowed access to the bus 10. In a memory-only DMA process, the handshake lines are not used; the channel decides when to request the bus 10, using an auto-request mechanism.

In addition to those four channels, the DMAC 20 has two autonomous (virtual) channels that are used for control of bus access in multiple-DMAC configurations, and a third autonomous channel that is used for handling interrupts of DMAC operations. The autonomous channels have request and acknowledge lines with priority values, but they have no registers, because they never drive the system bus 10 themselves. Their function is to resolve priorities among the "real" channels and remote requests from the autonomous-channel request lines.

When present, the CPU 12 is in charge of the system. It initializes the DMAC 20, sets up the channel processes, starts them, and handles events such as termination of a process and interrupts from a process. As stated above, DMA processes involve one (single) or two (double) addresses as shown in Table I.

TABLE I

| | |
|---|---|
| Single address Non-addressed I/O | <—-> Memory |
| Constant value | —-> Memory |
| Double address Addressed I/O | <—-> Memory |
| Memory | <—-> Memory |

THE BUILT AND TESTED 32000 BUS SYSTEM

The 32000 system defines a 32-bit address space, but only 24 address pins are provided in the 32016 and 32032 processors. The 32016 CPU has 16 data bits; the 32032 CPU has 32 data bits. The data bus is organized as two or four individually-enabled bytes. The basic bus cycle consists of four "T-states", T1-T4. The maximum bus speed for the military version is 10 Mhz; that is, 100 nsec per clock cycle (T-state); the commercial version runs at 15 MHz. In general, addresses are put on the bus 10 in T1, and data in T3. Various control signals tell the devices on the bus 10 when to read addresses, and when to read or write data. A 32201 TCU (Timing and Control Unit), or its logical equivalent, is needed in the system for generation of some of the bus control signals. The most important signals for 32016 are as shown in Table II (a leading asterisk signifies active low).

TABLE II

| Symbol | Name | Meaning | Source |
|---|---|---|---|
| *ADS | Address Strobe | Address valid | CPU |
| *DDIN | Data Direction In | Read vs. write | CPU |
| *HBE | High Byte Enable | Enable high data byte | CPU |
| *RD | Read Strobe | Data valid, read it | TCU |
| *WR | Write Strobe | Write to data bus | TCU |
| *DBE | Data Buffer Enable | Enable bus drivers | TCU |

In a 32016 system, there is no low byte enable control signal—the least significant address bit is used instead:

The low byte is enabled if this bit is zero. A 32032 system has four bus bytes: The DMAC 20 provides four Bus Enable signals (*BE[3 . . . 0]), instead of the single *HBE signal (plus low address bit) of the 32016.

There are several other control signals that are used for special purposes, such as Ready (RDY), which is used to extend the bus cycle for slow devices, Status (ST), which is a code that describes the current bus activity, and Timing State Output (*TSO), which indicates the start of states T2 and T4.

I/O is memory-mapped; that is, the CPU 12 has no specific control signal for indicating an I/O read or write, as opposed to a memory read or write. An addressed I/O device has a specific address, or set of addresses, in the 24-bit address space. It decodes the control and address signals in order to know when and how to connect to the data lines. Its data-control signals must be provided by some other device on the bus 10. The DMAC 20 provides two sets of these signals *IORD (I/O Read) and *IOWR (I/O Write) or *IODIR (I/O Direction) and *IODS (I/O Data Strobe). The system design determines which set of signals is bonded to the package pins.

Figure 3:
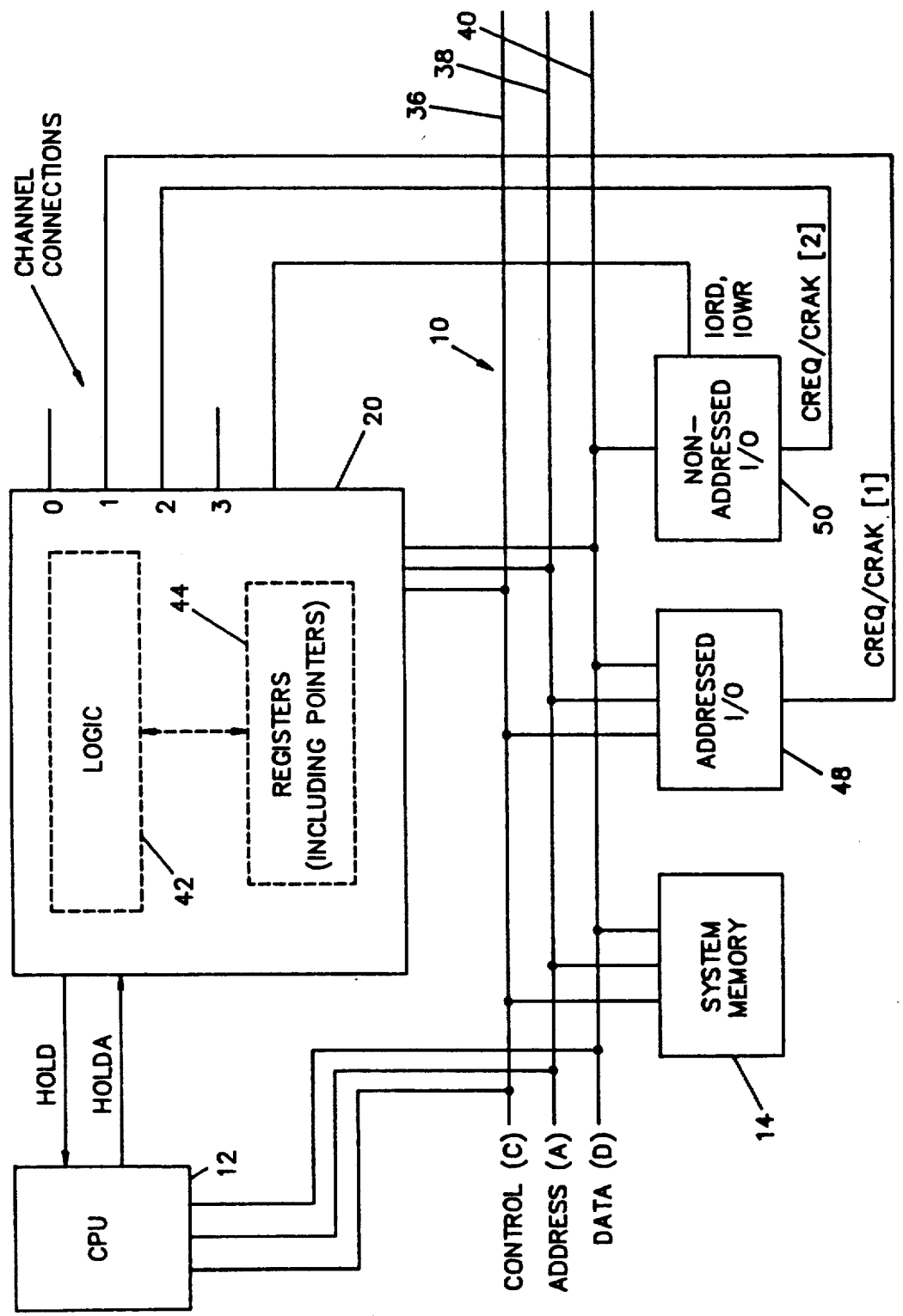
FIG. 3 is a block diagram of a computer system with the DMAC of the present invention connected as part thereof to control use of the bus.

The basic structure of a computer system with a DMAC 20 according to the present invention is shown in FIG. 3. The bus 10 is drawn showing its separate control (C), address (A), and data (D) lines, 36, 38 and 40, respectively. The CPU 12 and DMAC 20 act as coprocessors; both are capable of driving all CPU bus signals. One or the other (or neither) is the bus master at any time. The CPU 12 is the overall system master. The DMAC 20 requests the bus 10 by asserting HOLD. The CPU 12 releases the bus 10 and asserts HOLDA (Hold Acknowledge) to the DMAC 20. The DMAC 20 executes its task and de-asserts HOLD when finished; the CPU 12 then resumes its processing. When the DMAC 20 is bus master, it must generate the control signals listed above that have the CPU 12 as source. As described earlier herein with respect to the prior art, the bus 10 also has the random access memory (RAM) 14 connected to it along with other addressed I/O devices 48 and non-addressed I/O devices 50.

The DMAC 20 includes logic 42, registers 44 (including pointers to the system memory 14) and consists of a global area, four real-channel areas, and three autonomous-channel areas. The registers for the global and real-channel areas are shown in Tables XXIII and XXIV. All registers are 16 bits wide; 32-bit address values are implemented as register pairs.

A brief description of register functions is given here; they are described in detail later. The global registers deal mainly with interrupt status, priorities, and bus-access parameters; there is one of each in the DMAC 20 of the present invention. There is a separate set of channel registers for each of the four channels. The register pairs contain addresses as shown in Table III.

TABLE III

| PTR1 - | Address for the first bus cycle |
| PTR2 - | Address for the second bus cycle, if any |
| SAR - | Pointer to current command in system memory |
| PTR2 is not used in single-address operations. | |

Registers ID-PTR1 and ID-PTR2 contain increment-/decrement values for PTR1 and PTR2, respectively. PTR values may be incremented or decremented by 0, 1, 2 or 4.

The SAR (Sequence Address Register) points to the current command in system memory. It is, in effect, an instruction pointer. Its function is described later with respect to channel programs.

The Count register holds the loop count for repetitive operations. It is decremented for each operation (i.e., once per bus cycle for single-address operation, once per two bus cycles for double-address operations).

B-REG holds the bus data value. ACC is a general-purpose accumulator. The Mask register contains a mask value that is ANDed with B-REG in every arithmetic/logical operation. It may be loaded with any value at any time; its default value is FFFF (hexadecimal).

Each channel has an associated data segment. BASE and OFFSET contain the high and low words, respectively, of its address. The data segment is accessed by an indirect memory reference.

CSR and CC-STATE contain status bits, and Command contains the current command.

Considered as memory-mapped devices, the registers have addresses that are 8-bit offsets added to the DMAC's base address. A register address is constructed from the register number and the channel number as shown in FIG. 4. Bit 0 is zero because the address is word-aligned. Bits 2 and 1 select one of the four channels while bits 7-3 are the 5-bit register number value in Tables XXIII and XXIV. The channel-select bits are ignored for the global registers (Table XXIII), since these registers are common to all channels.

The DMAC 20 has four modes of operation; passive, master, arbitrator, and idle. In the passive mode, *CS (chip select) is active and an internal register is being written from or to the external bus 10. For the sake of testability, all registers are both readable and Writable. In the master mode, the DMAC 20 acts as bus master to execute real channel programs. In the arbitrator mode, the DMAC 20 is granted control of the bus 10 and passes it to a subordinate DMA capability. In the idle mode, the DMAC 20 monitors and interprets the real and autonomous channel request lines.

Although the DMAC 20 may be programmed in the passive mode by writing appropriate values to the registers, it is preferable to program it in the active mode by means of command records placed in memory by the CPU 12. Certain registers are then written in the passive mode to initialize and start it.

A CPU 12 can be used to initialize and start the DMAC 20, but it is not necessary—unlike prior art DMACs, the DMAC 20 of this invention can start itself. If there is no CPU in the system, the *LHLDA signal should be hardwired to a 0. This always grants the DMAC 20 control of the bus 10. During a reset, the registers of the DMAC 20 are initialized to the values shown below in Table IV. When *LHLDA is 0 during reset, the channels are all in setup mode, attempting to execute a program at memory location 000000. Each channel attempts to execute this program; but, because all channel priorities are set to zero, channel 3 actually executes the program that sets up the system. (Note: This is because in the logic of the DMAC 20 of this invention, channels with higher numbers win when channels with the same priority are making simultaneous requests.)

TABLE IV

| Register | Reset value in HEX |
|---|---|
| CSR | start? (see Note 1) |
| CC-STATE | 0000 |
| COMMAND | 0000 |

TABLE IV-continued

| Register | Reset value in HEX |
|---|---|
| CSR | start? (see Note 1) |
| COUNT | 0000 |
| ACC | 0000 |
| MASK | 1111 |
| SAR-LS | 0000 |
| SAR-MS | 0000 |
| OFFSET | 0000 |
| BASE | 0000 |
| PTR1-LS | 0000 |
| PTR1-MS | 0000 |
| PTR2-LS | 0000 |
| PTR2-MS | 0000 |
| CLK-CNT | 0000 |
| PR-BM | 0000 |
| PR-CH | 0000 |
| BWRF | 0000 |
| GCR | 0000 |
| ISR | 0000 |
| ID-PTR1 | 0000 |
| ID-PTR2 | 0000 |
| B-REG | 0000 |

Note 1:
start? = 0000 if *LHLDA = 1, and 0002 if *LHLDA = 0

DATA SIZE

The DMAC 20 supports 32-bit data buses by providing the four bus byte enabling signals *BE0–*BE3 and two buffer enables WE0–WE1. For 16-bit buses, *BE1 serves as *HBE. The DMAC data lines are connected to the low 16 bits (two lowest bytes) of the data bus 10. In a 32-bit system, external buffers, controlled by the buffer enables and *DMADIR (DMAC direction) can be used to multiplex the high and low halves of a data word onto the DMAC's data lines for transfer of 32-bit data in two 16-bit pieces.

Non-aligned data items (data byte zero not on bus byte zero) require special control of the bus-activating signals, and take two bus cycles for a read or write. To minimize complexity, the DMAC 20 does not support non-aligned and mixed-size data manipulations: Data items must be either word (16-bit) or byte (8-bit) size for any single operation. In operations that apply to two data items, both must be the same size. Therefore, the DMAC 20 provides the *BE[0 . . . 3] signals as outputs only and allows only a subset of the possible signal combinations generated by the CPU 12. The burden of dealing with more complex data organizations is placed on the CPU 12.

MASKABLE REGISTERS

Registers are loaded (written to) in one of two ways. The first is simply a copy to the register, which is appropriate for values such as COUNT, SAR and PTR. The second is a masked write of a bit value into specific bit positions, which is needed for certain control and status registers. Each DMAC register is hardwired for one of these methods.

The masked-write method works as follows: The high bit (15) of the source word is the bit-value field, containing the value to be written. The rest of the word (bits 14-0) is the mask field. Bit 15 is written to every bit in the destination register for which the same bit position in the source word contains a 1; the other bits in the destination register are not changed. (Bit 15 in the DMAC register obviously cannot be used, because there is no way to write a value into it.) For an example, see FIG. 5. If bit 15 in the source word had been 0, the corresponding bit positions in the destination register (14, 13, 5, 2, 1, 0) would have been 0 after the transfer.

The Global Configuration Register (GCR), the Interrupt Status Register (ISR), and the Channel Status Registers (CSR [0 . . . 3]), are maskable write registers. All other registers are direct copy registers.

HALTS AND INTERRUPTS

The halt status of a channel is contained in the Channel Status Register (CSR). The halt bit is named "Proceed", because the channel starts or continues if it is set. The interrupt status of a channel is contained in the Interrupt Status Register (ISR).

There are no opcodes that generate halts and interrupts automatically. A channel program sets its halt bit by writing to the CSR, and its interrupt bit by writing to the ISR, as explained below. (The DMAC 20 of this invention does execute a halt and interrupt when any condition occurs that causes the error bit to be set.)

The Channel Status Register (masked write, one per channel) is shown in FIG. 6. The Internal Status bits are used by the DMAC 20 to control state sequencing, and should not be changed by a program. The normal Status bits are defined as shown in Table V.

TABLE V

| Bit | Code | Name | Meaning if set (value = 1) |
|---|---|---|---|
| 0 | D | EOD Status | End of the block not reached |
| 1 | P | Proceed | Don't halt |
| 2 | E | Error | An error condition |
| 3 | S | Single Step | Halt every cycle |

The EOD bit is set to signal that the input device on this channel has not completed transfer of all the data in the current request. This bit can be used to determine if a channel stopped because there was no more data, or if the channel program executed a conditional command that caused the stop.

The Proceed bit may be regarded as an active-low halt bit.

The Error field signals a channel error if set. An error always causes a halt and interrupt. Errors include unaligned word accesses, destructive command codes and external bus errors when the DMAC 20 is bus master.

The Single Step field forces a halt on every bus cycle if set. Its intended applications are program analysis and debugging.

The Internal Status Bits are used by the DMAC control of the channel program execution and should never be written to. The capability to write to these bits is included as a testability feature only.

The Channel Status Register uses the masked-write method. To set the Proceed bit, for example, the source word is 1000 0000 0000 0010, which writes a 1 (bit 15) into bit position 1. To reset the Proceed bit, the source word is 0000 0000 0000 0010.

The Interrupt Status Register (global, masked write) is shown in FIG. 7. Each channel has an interrupt bit in the global Interrupt Status Register (ISR). Bit 0 corresponds to channel 0, bit 1 to channel 1, etc. A set bit (value=1) means that the corresponding channel has a pending interrupt.

The DMAC 20 generates an external interrupt signal, but does not jam a vector for it on the bus 10. The CPU 12 must read (i.e., poll) the ISR in order to determine which channels have interrupts pending.

If a channel program is specific to a particular channel, the interrupt bit is set by a simple masked write to the ISR (immediate operand). The interrupt bit for channel 1, for example, is set by writing 1000 0000 0000 0010.

If a channel program is to be channel-independent, the method described above cannot be used because the channel number must be known in order to set the mask bits. A channel-independent method is as follows:

A particular location (offset) in the channel's data segment is set aside to contain the source word for setting its interrupt. The same offset value is used for all channels; each channel has the bit and mask values for its particular interrupt-bit position stored there. The interrupt is written by using the offset as an indirect operand in a load register indirect command. The values stored at the interrupt offset for the four channels are as shown in Table VI.

TABLE VI

| Channel | Interrupt Value |
|---|---|
| 0 | 1000 0000 0000 0001 |
| 1 | 1000 0000 0000 0010 |
| 2 | 1000 0000 0000 0100 |
| 3 | 1000 0000 0000 1000 |

It is expected that a channel will set its interrupt bit, but not reset it; it is up to the CPU 12 to deal with the interrupt. There is nothing in the DMAC 20, however, to prevent a channel program from resetting an interrupt bit, as long as the channel is not halted.

The "hit bits" indicate when a channel in auto-request or throttle modes can make a request. Bit 11 corresponds to channel and bit 14 corresponds to channel 3. These bits indicate status only and do not control the requests. They should not be written to except in test mode.

PRIORITY

The global priority-control mechanism handles requests for bus access from on-chip channels through the *DREQ[3 . . . 0] signals, and from autonomous (external device) channels through the AREQ[1 . . . 0] and DATN signals. The priority values are contained in two global registers, PR-CH for the on-chip channels, and PR-BM for the autonomous channels. They are loaded by simple value-copying (i.e., not by masked write). The priority register PR-CH for on-chip channels is shown in FIG. 8 while the priority register PR-BM for autonomous channels is shown in FIG. 9.

Priority values are 4 bits unsigned. The highest priority is 15, the lowest is zero. A built-in priority among channels is used to resolve simultaneous requests with equal priority, as shown in Table VII; the channel that is highest in the list wins; that is, DATN wins over all others, AREQ[1] wins over all but DATN, etc.

TABLE VII

| DATN |
|---|
| AREQ[1] |
| AREQ[0] |
| Channel 3 |
| Channel 2 |
| Channel 1 |
| Channel 0 |

BUS ACCESS CONTROL

Figure 10:
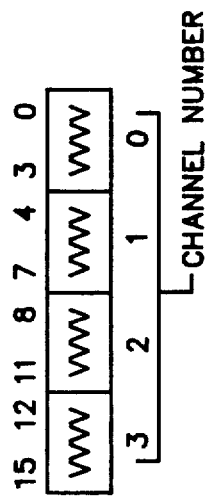
FIG. 10 is a drawing of the Global Control Register employed in the present invention in its tested embodiment.

The Global Control Register (GCR) contains three fields for bus control as shown in FIG. 10. The bus width bit is set to 1 for a 32-bit bus, 0 for a 16-bit bus. This bit controls the bus-enable signals BE[3 . . . 0] and HBE. The GCR is a maskable register; therefore, it takes two load operations to write both 1's and 0's into the burst count.

The DMA inhibit bit is a software controlled equivalent to the INHIBIT input. When this bit is a 1, the DMAC 20 does not acknowledge any requests. If the DMAC 20 wrote to the bit itself, it will get off the bus 10 at the end of the current bus cycle.

The burst count (BC) is an unsigned 6-bit value whose purpose is to decrease HOLD/HOLDA handshake overhead by giving the DMAC 20 a reasonable number of bus cycles at one time—when the DMAC 20 is granted the bus 10, it will keep it until there are no more requests, or it has had the bus 10 for BC cycles, whichever comes first. A channel will not necessarily be granted all BC cycles. A zero burst count allows the DMAC 20 to keep the bus 10 as long as it has requests.

BANDWIDTH RATIO CONTROL

Figure 11:
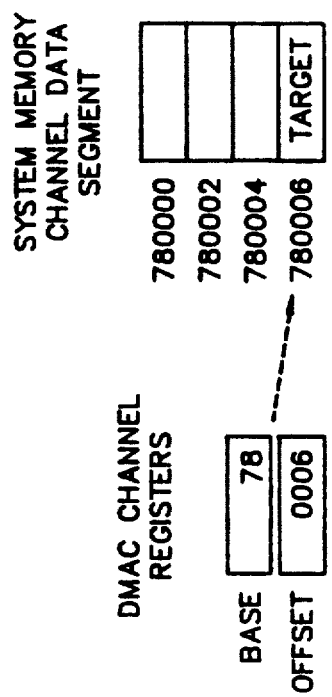
FIG. 11 is a drawing of the Bandwidth Ratio Factor Register employed in the present invention in its tested embodiment.

This is an important point of novelty of the DMAC 20 of the present invention over prior art DMACs. An I/O device connected to a DMAC channel has an explicit service request signal DREQ. The channel monitors this signal and generates a bus request only when it is asserted. Memory-only (auto-request) operations do not have explicit service request signals; the channel must decide for itself when to issue a bus request. The Bandwidth Ratio Factor (BWRF) for such channels determines the maximum frequency of their (auto)requests. The global BWRF register shown in FIG. 11 contains an unsigned 4-bit field for the BWRF of each channel.

Bandwidth ratio is defined as:

$$BWR = \frac{b}{b+r} = \frac{b}{BWRD}$$

,where b is the number of cycles that the bus 10 is held by the channel, and r is the number of cycles that it is released. (If the auto-request channel is the only channel making a request in the burst, then b is the burst value stored in the GCR.) The denominator BWRD has values in the set 1, 2, 4, . . . 32768. The BWRF value is the logarithm (base 2) of BWRD, in the range 0-15. A BWRF value of zero results in a BWRD value of unity, which causes the channel to take the bus 10 whenever it can get it. The DMAC 20 does not check the consistency of bandwidth allocations among channels; the programmer must check them to insure that the total bandwidth of the bus 10 is not exceeded. The "hit bits" in the ISR are used to determine when a channel is allowed to auto-request. There is one bit for each channel. The hit frequency is proportional to BWR. The hit bits are derived from the count in the global CLK-CNT (clock count) register, which simply increments on every four clock cycles.

It is important to note that bandwidth is distinct from priority. Priority is handled at the global level; it controls latency, which is the maximum time that a channel has to wait after it has requested the bus 10 before it is granted access. Bandwidth is controlled within the channel itself; it regulates the time between bus requests in the absence of another self-regulating mechanism (e.g., the inherently low speed of character-oriented I/O devices).

ADDRESS CONTROL

Figure 12:
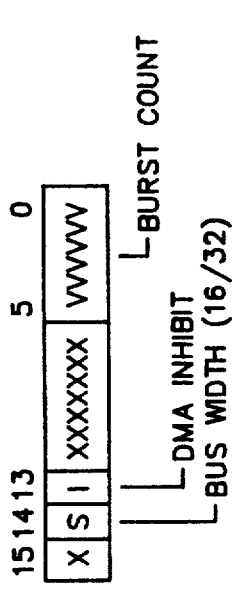
FIG. 12 is a drawing of the Pointer Increment/Decrement Registers employed in the present invention in its tested embodiment.

The address registers PTR1 and PTR2 are defined as 32-bit values; but, only 24 bits are implemented physically in the DMAC 20. PTR1 is loaded with the starting address of the memory block referenced in the first bus cycle. If the operation involves two addresses (double cycle), PTR2 is loaded with the starting address of the block referenced in the second bus cycle. Other values needed are loaded into the Pointer Increment/Decrement registers ID-PTR1 and ID-PTR2 shown in FIG. 12. The Local/Remote bit (15) is normally set (value=1) for the local bus. For a remote-bus access, it is reset. Data size defines the size of the data object as shown in Table VIII.

TABLE VIII

| Bit | | Data size |
|---|---|---|
| 13 | 12 | bits |
| 0 | 0 | 8 |
| 0 | 1 | 16 |
| 1 | X | 32 |

The value of bit 12 determines the size of the ALU operation performed. A value of 0 forces an 8 bit operation; and a 1 forces a 16 bit operation.

Step sign (bit 11) selects incrementing or decrementing of PTR1/PTR2: 0 for incrementing, 1 for decrementing.

Step size sets the increment/decrement value as shown in Table IX.

TABLE IX

| Bit | | | Step size | |
|---|---|---|---|---|
| 10 | 9 | 8 | | |
| 0 | 0 | 0 | 0 | Constant address |
| 0 | 0 | 1 | 1 | Byte |
| 0 | 1 | 0 | 2 | Word |
| 1 | 0 | 0 | 4 | Quad |

I/O DEVICE OPERATIONS

I/O device operations, as distinguished from auto-request (memory) operations, are controlled by handshake and synchronization signals. All I/O devices use the handshake signals; non-memory-mapped devices use the synchronization signals for reading and writing the data bus 10.

HANDSHAKE

The handshake signals *DREQ and *DACK are active low. The I/O device requests access to the bus 10 by asserting (pulling down) *DREQ. The channel grants access to the bus 10 by asserting (pulling down) *DACK. If the channel is not connected to an I/O device, *DREQ should be tied high.

The I/O device must hold *DREQ low until the channel asserts *DACK. If burst time is greater than unity, the *DREQ assertion applies to the entire burst; it must be held low as long as the channel wants service within the burst.

The channel asserts *DACK in T1 at the same time as the address strobe (*ADS), and releases it at the end of T4. The *DACK assertion edge in T1 thus provides an acknowledge signal to the I/O device for bus access.

SYNCHRONIZATION

The synchronization signals *IORD and *IOWR are generated only for I/O transfers, i.e., for opcodes with the auto-request bit=0. The *IODIR and *IODS are generated for any I/O operation and match the *DDIN and *DS inputs when not performing I/O operations.

MULTIPLE DMAC CONFIGURATIONS

As with prior art devices, only one DMAC 20 can co-exist directly on the bus 10 with a CPU. In a parallel-DMAC configuration, they must be connected to a bus arbitrator, which applies priority rules for selection among them. The DMAC 20 of the present invention supports a cascaded, or master/slave configuration, in which a group of DMACs are connected in trees. It is also possible to connect DMACs on different local buses to each other. This allows two DMACs to control interaction between two different buses.

CASCADED DMACs

In the master/slave configuration, one or two slave DMACs are tied to the autonomous (virtual) channels of a master DMAC. A DMAC 20 can be both a slave and a master of other slaves. Autonomous channel priority is controlled by a programmable register in the master; therefore, the I/O channels on a slave can be given higher priority than some or all of the I/O channels of the master.

The *LHOLD and *LHLDA (bus request and acknowledge) signals of the master DMAC are tied to the CPU 12 or bus arbiter. Up to two slave DMACs can tie their *LHOLD and *LHLDA signals to the *AREQn and *AACKn (autonomous channel request and acknowledge) signals of the master DMAC. To request the bus 10, a slave asserts its *LHOLD line. The master then asserts its *LHOLD and determines which channel will get the next bus access. When the master has received *LHLDA and the slave has priority, the master asserts *AACKn (the slave's *LHLDA) and tri-states its bus control lines. The slave then becomes bus master.

Each DMAC 20 has a BUSY_IN and a BUSY_OUT signal. If BUSY_IN is asserted, then one of that DMAC's subordinate DMACs is bus master. If BUSY_OUT is asserted, then either that DMAC 20 or one of its subordinates is the bus master. If the *LHLDA signal of the master DMAC is de-asserted, it must immediately de-assert all *AACKn signals. When the current bus cycle is completed, the current bus master must tri-state its controls and de-assert BUSY_OUT. If the transfer was not completed, the LHOLD line will not be de-asserted.

In systems with large DMAC tree structures, there is a BUS_MASTER output that can be used to force the DMAC tree to release the bus 10 as quickly as possible. This output is asserted only when the DMAC 20 driving it is actually the bus master. All of the BUS_MASTER outputs can be ORed together with the top level *LHOLD signal to form the input to the processors' *HOLD. This prevents idle cycles if the propagation delay from the bus master DMAC BUSY_OUT to the top DMAC 20 is too long.

MULTIPLE BUS CONFIGURATIONS

When a system has more than one local bus running asynchronously, the DMACs of the present invention can be used to provide the necessary controls to interface the buses. The address, control and data lines of each bus are connected through bi-directional buffers.

The enables of the buffers are controlled by the DMACs.

The DMACs are wired together by connecting *RHOLD and *RHLDA of DMAC 1 to one of the autonomous channels for DMAC 2. DMAC 1 is a slave of DMAC 2. To initiate the transfer, DMAC 1 must first request and get control of its own local bus. It then tells DMAC 2 that it wants control of bus 2. DMAC 2 resolves all of its priorities and requests bus 2. When DMAC 2 grants control of bus 2 to DMAC 1, the bi-directional buffers are enabled in the appropriate direction (as determined by DDIN) and DMAC 1 is bus master of both buses. If DMAC 1 must relinquish control of bus 1 before it is granted control of bus 2, then it must also relinquish its request for bus 2.

THE TESTED EMBODIMENT—DETAILS

Table X is a pin listing of the tested embodiment of the DMAC 20 of the present invention as implemented on a single chip. An asterisk preceding a signal name signifies active low.

TABLE X

| Pin Count | Name | Function |
|---|---|---|
| Input | | |
| 1 | *LHLDA | Local Hold Acknowledge Asserted by CPU, bus arbiter or another DMAC in response to assertion of *LHOLD. Tells the DMAC that it has access this bus cycle. If de-asserted while DMAC is asserting *LHOLD, the DMAC must release the bus, *RHOLD, and all acknowledge outputs, but need not release *LHOLD. |
| 1 | *RHLDA | Remote Hold Acknowledge Asserted by a CPU, bus arbiter or another DMAC in an external bus system, in response to a request for access to that system. If de-asserted while DMAC is asserting *RHOLD, the DMAC must release the bus and all acknowledge outputs, but need not release *RHOLD or *LHOLD. |
| 4 | *DREQ[3 ... 0] | Channel Request One per channel; used by the attached I/O device to assert a bus access request. |
| 2 | *AREQ[1 ... 0] | Autonomous Channel Request Asynchronous bus requests from devices that have their own DMA capability. Resolved within the DMAC by real-channel and autonomous-channel priorities. |
| 1 | *DATN | DMAC Attention Asynchronous bus request from a non-DMA device. It amounts to a get-off-the-bus request. It is resolved by priorities, as in *AREQ above. |
| 1 | INHIBIT | Asynchronous bus request from a non-DMA device. It always has the highest priority. The DMAC must release *LHOLD immediately and get off the bus after the current bus cycle (indicated by *BYSO). |
| 1 | *RST | Reset Resets all DMAC registers to initial states if held low for at least 4 clock cycles. |
| 1 | CLK | Clock A maximum 10 MHz system clock with a 50% duty cycle. |
| 1 | RDY | Ready Signal from NS32201 TCU. When asserted, it prolongs the T3 state, and thus extends the current bus cycle. It is used with slow peripherals or memory. It is sampled at the falling edge of PHI[2] to determine whether the following T3 state should be extended. |

TABLE X-continued

| Pin Count | Name | Function |
|---|---|---|
| 1 | *CS | Chip Select When asserted, it enables the DMAC passive mode to gain access to its internal registers. |
| 1 | *BERR | Bus Error Indicates a serious error during the current bus cycle. If the DMAC was bus master, the error flag of the executing channel will be set causing a halt and interrupt for that channel. |
| 1 | *EOD | Channel End of Data Generated by a channel device to indicate that the current data trnasfer is the last one. |
| 1 | *BSYI | Busy In This signal is asserted when any subordinate DMAC is acting as bus master. |
| Total 17 | | |
| Output | | |
| 1 | *LHOLD | Local Hold Request Asserted to request bus access. Connected to the CPU, or to an arbiter for multiple-DMAC systems |
| 1 | *RHOLD | Remote Hold Asserted to request access to a remote bus. Can only be asserted when the DMAC is bus master of the local bus (*LHOLDA is asserted). Can be connected to the CPU, DMAC or bus arbiter of the remote bus. |
| 4 | *DACK[3 ... 0] | Channel Acknowledge One per channel, to signal the attached I/O device that is has access during the current bus cycle. |
| 2 | *AACK[1 ... 0] | Autonomous Channel Acknowledge One per autonomous channel. It signals the subordinate DMAC that it can become bus master during the current bus cycle. |
| 1 | *INT | Interrupt Asserted to indicate that one or more of the DMAC real channels is requesting interrupt service. The CPU must poll the Interrupt Status Register (ISR) to determine which channel or channels generated the request. |
| 4 | *BE[3 ... 0] | Byte Enables Asserted to indicate which byte(s) are being accessed in a 16 or 32 bit bus system. In a 16 bit system *BEI corresponds to *HBE generated by the CPU. Table XXV shows the only combinations of these signals that the DMAC allows. |
| Total 13 | | |
| Alternative Outputs | | |

The pairs (*IORD, *IOWR) and (*IODIR, *IODS) are alternative methods of driving I/O devices. All four signals are available at bonding pads; only one of the pairs need be bonded out.

| 1 | *IORD | I/O Device Read |

TABLE X-continued

| Pin Count | Name | Function |
|---|---|---|
| 1 | *IOWR | Enables an input operation to the attached I/O device in single-address direct transfers. I/O Device Write Enables an output operation to the attached I/O device in single-address direct transfers. |
| 1 | *IODIR | I/O Direction In master mode, selects read or write for I/O. (Valid from beginning of T1 to end of T4.) When asserted, it indicates an input or read (*IODIR = 0). When de-asserted, it indicates an output or write. In idle mode, *IODIR is the same as *DDIN. |
| 1 | *IODS | I/O Data Strobe In master mode, it is asserted from the beginning of T2 to the beginning of T4 when there is an I/O read or write. During a single-address direct read (input) it is asserted from the beginning of T2 to the middle of T4. In idle mode *IODS is the same as *DS. |

Total 2

Optional Outouts

The following outputs are available at bonding pads. They may be selected for bonding out, as required for the intended applications.

| Pin Count | Name | Function |
|---|---|---|
| 1 | *DBE | Data Buffer Enable Enable data bus drivers. It is asserted from the middle of T2 to the middle of T4. It is only asserted in bus cycles with the DMAC in master mode or passive (*DS asserted) modes. |
| 1 | *DMADIR | DMAC Direction Asserted from the beginning of T1 to the end of T4 when DMAC registers are being read to the bus (*DMADIR = 0). This signal is valid in any mode. |
| 1 | *BSYO | Busy Out Asserted (0) in master mode and in arbiter mode. De-asserted in passive and idle modes. |
| 2 | WE[0 . . . 1] | Word Enables Enable data bus multiplexers in 32-bit systems. They are only asserted in bus cycles with the DMAC in master or passive modes. |
| 1 | *BMASTER | Bus Master Asserted (0) in master mode. De-asserted in arbiter, passive and idle modes. |
| 2 | PHI[1 . . . 2] | Clock phase 1 and 2 Non-overlapping clocks generated internally from CLOCK. They are included as possible outputs for testability purposes. |

Total 0 to 8

Input/Output

| Pin Count | Name | Function |
|---|---|---|
| 1 | *ADS | Address Strobe Asserted when the address is valid on the bus. In master mode it is asserted from the beginning of T1 to the middle of T1. When not in master mode, the signal is an output. |
| 16 | AD[15 . . . 0] | Address and Data Multiplexed address/data bus. Address when *ADS is asserted (0) and data otherwise. In master mode, the direction is controlled by *ADS and *DMADIR. In passive mode, the direction is controlled by *ADS and *DDIN. Otherwise they are inputs. |
| 8 | A[23 . . . 16] | Address Most significant bits of the address bus. An output in master mode and an input otherwise. |
| 1 | *DDIN | Data Direction In In master mode, the DMAC asserts (0) the signal for memory or memory-mapped reads from the beginning of T1 to the end of T4. The DMAC de-asserts the signal for memory writes. The signal is an input when not in master mode. In passive mode, an asserted signal indicates a read of a DMAC register to the bus. |
| 1 | *DS | Data Strobe In master mode, the output is asserted from the beginning of T2 to the beginning of T4. When not in master mode, the signal is an input. In passive mode the trailing edge indicates when the DMAC reads data from the bus. |

Total 27

Power/Ground

| | | |
|---|---|---|
| 4 | | Two power and two ground |

Total pin count = 63 to 71
Total pad count = 73

DESCRIPTION OF DMAC OPERATIONS

As described above, in the tested embodiment of the present invention being described herein data values are 16 bits and address values are 24 bits. Pointer addresses are incremented or decremented between successive operations with programmed values=0, 1, 2, and 4 corresponding to constant address, byte, word and quad data, respectively. (A constant address is used for a memory-mapped I/O device.) The classes of data operation shown in Table XI are available.

TABLE XI

| Operation | Number of Addresses | Data Width |
|---|---|---|
| Memory to memory transfer | 2 | 16 |
| Memory to/from memory-mapped I/O transfer | 2 | 16 |
| Compare memory blocks | 2 | 16 |
| Memory to/from non-addressed I/O transfer | 1 | 16,32 |
| Copy value to memory | 1 | 16 |
| Search memory for value | 1 | 16 |
| Generate a checksum | 1 | 16 |

Transfer from one I/0 device to another is not possible in a single-channel process because the request/acknowledge signals for a channel can be connected to only one I/O device. Transfers between I/O devices must be set up as a cooperative process between two channels.

The 32-bit copy between memory and non-addressed I/O is a special operation. The DMAC 20 does not participate in the data transfer directly; it puts the address strobe (*ADS), data direction (*DDIN), and the memory address on the bus 10 in T1, and asserts the data and I/O control signals in T2 to T4. The TCU decodes the *DDIN signal, and generates a read or write strobe (*RD, *WR) for the memory access in T3. The entire operation takes one bus cycle. At maximum bus speed (10 MHz clock), the data rate is 80 megabaud (32 bits/400 nanoseconds).

CHANNEL PROGRAMS

A channel program is a sequence of commands in system memory 14, for that channel. The Sequence Address Register (SAR) points to the current command; it is, in effect, a program counter. A program consists of one or more program segments, each of which is made up of a number of load/store commands that set up channel registers and memory areas, and an access command that performs the channel operation repetitively. The SAR points to the first command in the segment when the segment is ready to be started. When a command is executed, the word in system memory pointed to by the SAR is copied to the Command register and decoded. If the "skip" condition is not met (see below), the next word (SAR +2) is copied to whichever registers is appropriate for the command: count, offset, etc. The SAR is incremented to point to the next command, and the current command is executed. When the command terminates, the cycle repeats. If the command loaded a new address into the SAR the program branches to that address. Otherwise, the program continues with the next command.

The program steps through the load/store commands until it reaches an access command. The access command contains an opcode field that defines the operation to be performed, and a count field that defines the number of times the operation is to be repeated.

Termination of an access command occurs for one of three reasons (1) it has gone to completion [i.e., the repetition count (from repetition counter block 30) has decremented to zero]; (2) a conditional command has generated a TRUE condition (as determined by the arithmetic and logic block 34), or (3) end of data has been asserted by an input device via the EOD pin. When it terminates, the channel's condition bits are set or reset, depending on the command and on the way in which it terminated.

The first action of any command, after loading and decoding, is to test for match between its programmed "skip code" and the value left in the accumulator by the previous command. If they match, the command is skipped (i.e., not executed); the SAR points to the next command. Skip conditions are as shown in Table XII.

TABLE XII

Never skip (i.e., execute the current command unconditionally)
Always skip (i.e., never execute the current command)
Skip if
    ACC LT 0
    ACC LE 0
    ACC EQ 0
    ACC NE 0
    ACC GE 0
    ACC GT 0

Virtually any register may be loaded directly by writing a value to its absolute address, which is an 8-bit offset from the DMAC's base address. The only register that must be loaded directly is the SAR; it takes the address of the first instruction of the channel program. All other register loads may be done by using commands described below.

CHANNEL DATA SEGMENTS

Figure 13:
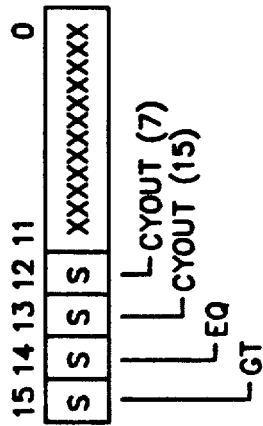
FIG. 13 is a drawing illustrating the way in which the Base and Offset Registers employed in the present invention in its tested embodiment are concatenated to form the actual address of an item.

Each channel has a pair of registers, BASE and OFFSET, that combine to point to a data segment in system memory 14. The operand field of a command is either (1) a value (Immediate), or (2) the address of a value (Indirect). The operand for an indirect address is an offset value into the channel's data segment. The BASE register contains the high 16 bits of the data-segment address, the OFFSET register contains the low 16 bits. The base and offset values are concatenated to form the address of the item. FIG. 13 illustrates an address calculation (values are hexadecimal).

COMMAND STRUCTURE

Each channel in the built and tested DMAC chip is programmed individually by means of arrays of commands in memory. A command consists of a command field followed by an operand field, both 16 bits wide. Commands are either SETUP mode or ACCESS mode. SETUP commands are used to load DMAC registers from memory and store register contents in memory; both 16- and 32-bit loads and stores are provided. When the appropriate channel registers have been loaded, ACCESS commands are used to execute operations repetitively; their operands are the COUNT values. ACCESS commands for the kinds of operation listed in Table XIII are provided.

TABLE XII

Copy a memory block from one location to another
Copy a memory block to an output device
Copy an input device to a memory block
Fill a memory block with a constant value (e.g., clear a block)
Search a memory block for a specified value
Compare two memory blocks for equality
Compute various forms of checksum for a memory block In the descriptions that follow, the following abbreviations are used:
MEM = Memory (RAM or ROM)
MMI = Memory-mapped (addressed) input device
MMO = Memory-mapped (addressed) output device
NAI = Non-addressed input device
NAO = Non-addressed output device
DMR = DMAC register (16 bits)
DMP = DMAC register pair (32 bits)
M1 = Memory location/value addressed by PTR1
M2 = Memory location/value addressed by PTR2
IN = Value from NAI device
OUT = Value to NAO device
ACC = Accumulator register value
op = ALU operation

SETUP MODE

All transfers are 16 bit. 32-bit values are handled in two separate bus cycles; data must be quad-aligned (address bits 1 and 0 both 0). Transfers are either (1) as a 5-bit offset (register number) from the base of the current-channel register set, or (2) to a global register. This permits programs to be written in channel-independent form, because the absolute address of a channel register is not required. Programs may thus be re-entrant and sharable among channels. (Transfers to and from a different channel are carried out by AC- CESS mode commands, using the absolute DMAC address plus the 8-bit register offset.)

Double-register (32 bit) load and store operations (PTR1, PTR2, SAR) are performed in two bus cycles. The memory and register addresses in the command are for the least significant halves; the DMAC 20 automatically increments the addresses for the most significant halves. For example, the register number for loading and storing PTR1 is 12.

TABLE XIV

| Src | Dst | No. Addr. | Operation | Load/Store | Operand |
|-----|-----|-----------|-----------|------------|---------|
| MEM | DMR | 1 | Memory → Register | Load | Immediate |
| MEM | DMR | 1 | Memory → Register | Load | Indirect |
| MEM | ACC | 1 | ACC op Memory → ACC | Load | Immediate |
| MEM | ACC | 1 | ACC op Memory → ACC | Load | Indirect |
| DMR | MEM | 1 | Register → Memory | Store | Indirect |
| MEM | DMP | 2 | Memory → Register pair | Load | Indirect |
| DMP | MEM | 2 | Register pair → Memory | Store | Indirect |

Setup commands can be executed in two modes, namely throttle mode and not throttle mode. When the throttle bit is 0, the command generates urgent requests. This means that the setup command will execute as fast as the channel priority allows. When the throttle bit is 1, the command generates auto-requests. Auto-requests are subject to bandwidth control as described elsewhere.

ACCESS MODE

Transfers may be 8 or 16 bits; 16-bit data must be aligned on word boundaries (address bit 0=0). The operand is the COUNT value for the operation (Immediate or Indirect). Unconditional operations continue until COUNT is satisfied or the EOD bit is asserted; conditional operations also terminate if the condition is satisfied.

In memory only operations, the DMAC 20 makes auto-requests which are subject to bandwidth control. In I/O device operations, requests are generated by the I/O device and are not subject to any control other than priority.

COMMAND FORMATS

Figure 14:
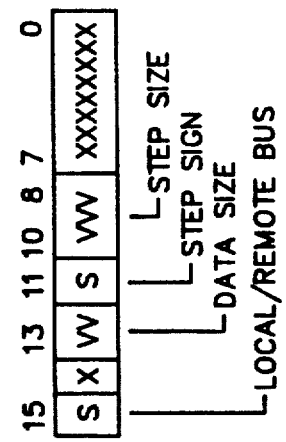
FIG. 14 is a drawing of a DMAC command as employed in the present invention in its tested embodiment.

DMAC commands consist of two 16-bit words as shown in FIG. 14. The first is the command word; the second is the operand word. The operand word is either an immediate value or an indirect offset that points to the value. In setup mode, only register-load commands can take an immediate value. Indirect offsets in setup commands are pointers to memory for load or store register and register pair commands. The operand in access mode is the repetition count value which can be loaded as immediate or an indirect operand.

Each bit of the command word has a specific meaning. In access mode, there are sometimes two combinations of bits that produce equivalent results. These combinations are "folded" into single commands. These commands are listed hereinafter with the folded bit shown as "Y". To allow for future command expansion, these commands should always be coded with the "Y" as 0.

Certain commands in setup mode are potentially destructive to a running DMAC program. The codes for these commands are not listed herein. If the DMAC 20 receives one of these codes, it sets the channel error bit, which causes the channel to halt and interrupt.

Every command is of the form IF NOT SKIP CODE THEN EXECUTE COMMAND CODE. The skip code condition is checked before the execution of the command. In access mode, where the command is executed COUNT times, the condition is checked only before the first execution.

The bits of the command word have the meanings set forth in Table XVI.

TABLE XV

| Src | Dst | No. Addr. | Operation | Termination Condition | Side Effects |
|-----|-----|-----------|-----------|----------------------|--------------|
| SINGLE-CYCLE MEMORY OPERATIONS | | | | | |
| Search Memory | | | | | |
| | MEM | 1 | | ACC = M1 | |
| Checksum | | | | | |
| | MEM | 1 | ACC op M1 → ACC | | |
| Fill Memory | | | | | |
| | MEM | 1 | Breg → M1 | | |
| DOUBLE-CYCLE MEMORY-TO-MEMORY OPERATIONS | | | | | |
| Compare Memory Blocks | | | | | |
| MEM | MEM | 2 | | M1 <> M2 | M1 → ACC |
| Unconditional Copy | | | | | |
| MEM | MEM | 2 | M1 → M2 | | ACC op M1 → ACC |
| NON-ADDRESS I/O DEVICE OPERATIONS | | | | | |
| Copy | | | | | |
| MEM | NAO | 1 | M1 → OUT | ACC = M1 | |
| MEM | NAO | 1 | M1 → OUT | | ACC op M1 → ACC |
| NAI | MEM | 1 | IN → M1 | ACC = IN | |
| NAI | MEM | 1 | IN → M1 | | ACC op IN → ACC |
| MEMORY-MAPPED I/O DEVICE OPERATIONS | | | | | |
| Copy | | | | | |
| MEM | MMO | 2 | M1 → M2 | ACC = M1 | |
| MEM | MMO | 2 | M1 → M2 | | ACC op M1 → ACC |
| MMI | MEM | 2 | M1 → M2 | ACC = M1 | |
| MMI | MEM | 2 | M1 → M2 | | ACC op M1 → ACC |

TABLE XVI

| Bit | Setup Mode | Access Mode |
|---|---|---|
| 15 | 0 = setup mode | 1 = access mode |
| 14 | 0 = single, 1 = double cycle | 0 = single,1 = double |
| 13 | 0 = load, 1 = store register | 0 = read, 1 = write |
| 12 | 0 = reg. select, 1 = arithmetic | 0 = conditional, 1 = |
| 11 | 0 = indirect, 1 = immediate opnd | 0 = indirect,1 = immediate opnd |
| 10 | Spare | Spare |
| 9 | " | " |
| 8 | Skip code | Skip code |
| 7 | " | " |
| 6 | " | " |
| 5 | Throttle | Auto-request |

The meaning of the Arith/Cond/Regsel field depends on the value of bit 12:

Bit 12 = 1 (arithmetic)

| 4 | Not used | Not used |
|---|---|---|
| 3 | Opcode | Opcode |
| 2 | " | " |
| 1 | " | " |
| 0 | " | " |

Bit 12 = 0 (register select or conditional)

| 4 | Register number | Not used |
|---|---|---|
| 3 | " | " |
| 2 | " | " |
| 1 | " | " |
| 0 | " | " |

The Throttle bit in SETUP commands (bit 5) is analogous to the auto-request bit in ACCESS commands, in that it is used for regulation of bus access requests. It has, however, no functional significance: The meaning of a SETUP command is independent of the Throttle bit.

COMMAND CODES

The Command Codes are listed in Table XVII.

TABLE XVII

| Command Code | Arith/Cond/Regsel | | |
|---|---|---|---|
| | | SETUP MODE | |
| 0000 | Reg number | load indirect | M1 → DMR |
| 0001 | Reg number | load immediate | M1 → DMR |
| 0010 | Opcode | load ACC indirect | ACC op M1 →ACC |
| 0011 | Opcode | load ACC immediate | ACC op M1 →ACC |
| 0100 | Reg number | store indirect | DMR → M1 |
| 1000 | Regpair number | load indirect | M1 → DMP |
| 1100 | Regpair number | store indirect | DMP → M1 |
| | | ACCESS MODE | |
| Auto-request on (bit 5 = 1) -- Memory operations | | | |
| 000X | | search memory | quit if ACC= M1 |
| 001X | Opcode | checksum memory | ACC op m1 →ACC |
| 01YX | | fill memory | Breg → M1 |
| 1Y0X | | compare mem blocks | Quit if M1 M2 |
| 1Y1X | Opcode | copy memory block | ACC op M1 →ACC |
| Auto-request off (bit 5 = 0) -- Device operations | | | |
| 000X | | M1 → NAO | Quit if ACC=M1 |
| 001X | Opcode | M1 → NAO | ACC op M1 →ACC |
| 010X | | NAI → M1 | Quit if ACC=NAI |
| 011X | Opcode | NAI → M1 | ACC op NAI→ACC |
| 100X | | M1 → MMO | Quit if ACC=M1 |
| 101X | Opcode | M1 → MMO | ACC op M1 →ACC |
| 110X | | MM1 → M2 | Quit if ACC=MM1 |
| 111X | Opcode | MM1 → M2 | ACC op MM1→ACC |

SKIP CODES

After a command is loaded, the skip test is made. If it is satisfied, the SAR is incremented immediately. That is, the command is skipped according to the conditions listed in Table XVIII.

TABLE XVIII

| Skip if skip code = | |
|---|---|
| 000 | never |
| 001 | ACC EQ 0 |
| 010 | AC FT 0 |
| 011 | ACC GE 0 |
| 100 | always |
| 101 | ACC NE 0 |
| 110 | ACC LE 0 |
| 111 | ACC LT 0 |

ARITHMETIC STATUS

Figure 15:
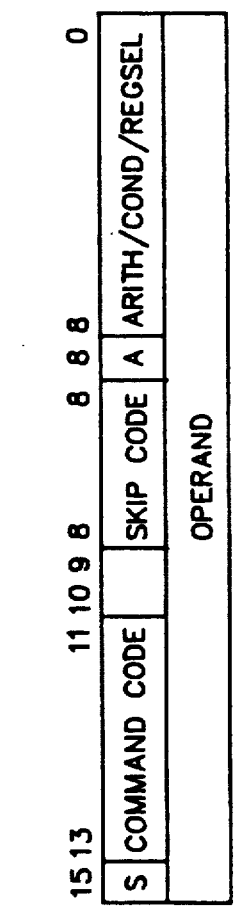
FIG. 15 is a drawing of the CC-State Register employed in the present invention in its tested embodiment.

The CC-STATE register as depicted in FIG. 15 contains the conditions bits generated in arithmetic operations. It is maintained by the DMAC 20. CYOUT (15) and CYOUT (7) are the carry bits from the word and byte operations. The skip-code bits in the command word are related to the GT and EQ bits in CC-STATE as shown in Table XIX.

TABLE XIX

| Skip Code Bit | |
|---|---|
| 8 | 0=skip if any bits are 1 under the mask<br>1=skip if all bits are 0 under the mask |
| 7 | mask for GT bit |
| 6 | mask for EQ bit |

Table XX shows all combinations and is a variation of the data in Table XVIII above.

TABLE XX

| Skip Code | GT | EQ | |
|---|---|---|---|
| 0 00 | X | X | Never |
| 0 01 | X | V | EQ |
| 0 10 | V | X | GT |
| 0 11 | V | V | GT or EQ → GE |
| 1 00 | X | X | Always |
| 1 01 | X | V | not EQ → NE |
| 1 10 | V | X | not GT → LE |
| 1 11 | V | V | not GT and not EQ → LT |

ARITHMETIC OPCODES

The ALU operations are described below in Table XXI. They are the "op" in the command-description tables, e.g., ACC op M1. ACC=accumulator register, B=bus-value register AND mask register, /B=(complement of bus-value register) AND mask register. Carry (CY) is the value from the preceding operation.

TABLE XXI

| Bit | | | | |
|---|---|---|---|---|
| 3,2 CY | 1 CLRA | 0 CPLB | Operation | Remarks |
| 00 | 0 | 0 | ACC ← ACC XOR B | |
| 00 | 0 | 1 | ACC ← ACC XOR B | |
| 00 | 1 | 0 | ACC ← B | Simple mem copy |
| 00 | 1 | 1 | ACC ← /B | |
| 01 | 0 | 0 | ACC ← ACC + B + CY | Sum |
| 01 | 0 | 1 | ACC ← ACC + /B + CY | |
| 01 | 1 | 0 | ACC ← B + CY | |
| 01 | 1 | 1 | ACC ← /B + CY | |
| 10 | 0 | 0 | ACC ← ACC + B | |
| 10 | 0 | 1 | ACC ← ACC +/B | |
| 10 | 1 | 0 | ACC ← B | Same as 0010 |
| 10 | 1 | 1 | ACC ← /B | Same as 0011 |

TABLE XXI-continued

| Bit 3,2 CY | Bit 1 CLRA | Bit 0 CPLB | Operation | Remarks |
|---|---|---|---|---|
| 11 | 0 | 0 | ACC ← ACC + B + 1 | |
| 11 | 0 | 1 | ACC ← ACC − B | /B + 1 IS −B |
| 11 | 1 | 0 | ACC ← B + 1 | |
| 11 | 1 | 1 | ACC ← −B | |

The opcodes are defined by bits 3-0 as shown in Table XXII.

TABLE XXII

| Bit | Meaning |
|---|---|
| 3,2 | Carry control: 00 Suppress carry propagation between bits 01 Add with CY 10 Force CY = 0 11 Force BY = 1 |
| 1 | Clear ACC 0 = Do not clear ACC 1 = Clear ACC |
| 0 | Complement B 0 = Do not complement 1 = Complement |

TABLE XXIII

Addressable Global Registers

| Name | Number | Contents |
|---|---|---|
| CLK-CNT | 16 | Absolute clock count |
| PR-BM | 17 | Autonomous channel priorities |
| PR-CH | 18 | Real channel priorities |
| BWFR | 19 | Bus bandwidth ratio factor |
| GCR | 20 | Configuration |
| ISR | 21 | Interrupt status |

TABLE XXIV

Addressable Channel Registers

| Name | Number | Contents |
|---|---|---|
| CSR | 0 | Channel status |
| CC-STATE | 1 | Arithmetic status |
| Command | 2 | Bit fields defining the operation |
| Count | 3 | Repeat count for the operation |
| ACC | 4 | General data values |
| MASK | 6 | Mask value |
| SAR-LS | 8 | Low half of sequence address |
| SAR-MS | 9 | High half of sequence address |
| OFFSET | 10 | Offset in channel data area |
| BASE | 11 | Base address of channel data area |
| PTR1-LS | 12 | Low half of address pointer 1 |
| PTR1-MS | 13 | High half of address pointer 1 |
| PTR2-LS | 14 | Low half of address printer 2 |
| PTR2-MS | 15 | High half of address pointer 2 |
| ID-PTR1 | 25 | Increment/decrement, PTR1 |
| ID-PTR2 | 27 | Increment/decrement, PTR2 |
| B-REG | 30 | Data-bus value |

TABLE XXV

| Number of Bits | Address Bits | | Byte Bank Enables 32-Bit Systems | | | | 16-Bit Systems |
|---|---|---|---|---|---|---|---|
| | ADI | AD0 | *BE3 | *BE2 | *BE1 | *BE0 | *BE1(*HBE) |
| 8 | 0 | 0 | 1 | 1 | 1 | 0 | 1 |
| 8 | 0 | 1 | 1 | 1 | 0 | 1 | 0 |
| 8 | 1 | 0 | 1 | 0 | 1 | 1 | 1 |
| 8 | 1 | 1 | 0 | 1 | 1 | 1 | 0 |
| 16 | 0 | 0 | 1 | 1 | 0 | 0 | 0 |
| 16 | 0 | 1 | Non-aligned − illegal | | | | |
| 16 | 1 | 0 | 0 | 0 | 1 | 1 | 0 |
| 16 | 1 | 1 | Non-aligned − illegal | | | | |
| 32 | 0 | 0 | 0 | 0 | 0 | 0 | |
| 32 | 0 | 1 | Non-aligned − illegal | | | | |
| 32 | 1 | 0 | Non-aligned − illegal | | | | |
| 32 | 1 | 1 | Non-aligned − illegal | | | | |

I claim:

1. In a data system having a memory, plural input/output (I/O) devices and a bus connecting each of said I/O devices to said memory, a direct memory access (DMA) controller for regulating access of each of said I/O devices to said bus, said DMA controller comprising:

global register means comprising:
priority register means for storing priority parameters for each of said I/O devices, said parameters corresponding to relative priorities accorded to simultaneously pending requests by at least some of said plural I/O devices for access to said bus,
interrupt register means for storing requests for access to said bus from respective ones of said I/O devices,
resolver means for determining from said priority register means and said interrupt register means one of said I/O devices to have access to said bus and for transmitting an acknowledgment to said one I/O device enabling said device to communicate with said memory on said bus;

channel register means comprising:
pointer register means for storing addresses of locations in said memory for communication with said one I/O device via said bus,
sequence register means for storing an address of a location in said memory containing a channel program instruction which is to be executed next;

arithmetic logic unit (ALU) means comprising:
means for one of incrementing and decrementing addresses stored in said pointer register means in accordance with a corresponding channel program instruction,
means for computing the next address to be stored in said sequence register means in accordance with a corresponding channel program instruction,
means for computing an initial contents of each of said register means in said channel register means in accordance with a corresponding channel program instruction;

said memory containing a sequence of channel program instructions for each of said channels at locations in said memory whose addresses are sequentially stored in said sequence register means, said instructions comprising means for defining:
- a set up operation wherein the contents of each of said registers in said channel register means is initialized in accordance with said initial contents computed by said ALU means,
- an access operation wherein data is transferred on said bus between a location in said memory whose address is currently stored in said pointer register means and said one I/O device enabled by said resolver means.

2. The DMA controller of claim 1 wherein said channel register means further comprise:
- channel status register means for storing a data count corresponding to a data block size to be transferred in the corresponding channel, and
- counter register means for storing a repeat count of the number of times an access operation is to be repeated in a corresponding channel to complete a corresponding channel program, wherein the contents of said channel status register means and said counter register means is initialized in accordance with said sequence of program instructions corresponding to said set up operation.

3. The DMA controller of claim 2 further comprising means for causing said DMA controller to relinquish access to said bus whenever one of:
- the amount of data transferred on said bus during said access operation equals the data count stored in said channel status register, and
- the access instruction has been executed repeatedly a number of times equal to said repeat count stored in said counter register means.

4. The DMA controller of claim 1 wherein a central processing unit (CPU) is connected to said bus, said DMA controller further comprising:
- means for asserting a bus hold request to said CPU whenever said resolver means selects one of said I/O devices for access to said bus, and
- wherein said CPU comprises means for enabling said DMA controller to control access to said bus by transmitting a bus hold acknowledgment to said DMA controller.

5. The DMA controller of claim 4 further comprising:
- burst register means for storing a minimum amount of time that said DMA controller controls access to said bus upon being enabled by said CPU; and
- means for ignoring control signals from said CPU removing access to said bus from said DMA controller.

6. The DMA controller of claim 1 wherein one of said I/O devices comprises another DMA controller which is a slave to said DMA controller.

7. The DMA controller of claim 1 wherein said global register means further comprise:
- bandwidth register means for defining for each I/O device the amount of time that it is permitted to have access to said bus relative to the amount of time that it does not have access to said bus, and
- means for terminating the access of said one I/O device upon expiration of said amount of time, wherein the contents of said bandwidth register is initialized in accordance with said sequence of instructions corresponding to said set up operation.

8. In a direct memory access controller for a data system having a memory, plural input/output (I/O) devices and a bus connecting each of said I/O devices to said memory, the direct memory access (DMA) controller for regulating access of each of said I/O devices to said bus, the improvement comprising:
- global register means comprising:
  - priority register means for storing priority parameters for each of said I/O devices, said parameters corresponding to relative priorities accorded to simultaneously pending requests by at least some of said plural I/O devices for access to said bus,
  - interrupt register means for storing requests for access to said bus from respective ones of said I/O devices,
  - resolver means for determining from said priority register means and said interrupt register means one of said I/O devices to have access to said bus and for transmitting an acknowledgment to said one I/O device enabling said device to communicate data on said bus;
- channel register means comprising:
  - pointer register means for storing addresses of locations in said memory for communication with said one I/O device via said bus,
  - sequence register means for storing an address of a location in said memory containing a channel program instruction which is to be executed next;
- arithmetic logic unit (ALU) means comprising:
  - means for one of incrementing and decrementing addresses stored in said pointer register means,
  - means for computing the next address to be stored in said sequence register means,
  - means for computing an initial contents of each of said register means in said channel register means;
- said memory containing a sequence of channel program instructions for each of said channels at locations in said memory whose addresses are sequentially stored in said sequence register means, said instructions comprising means for defining:
  - a set up operation wherein the contents of each of said registers in said channel register means is initialized in accordance with said initial contents computed by said ALU means,
  - an access operation wherein data is transferred on said bus between a location in said memory whose address is currently stored in said pointer register means and said one I/O device enabled by said resolver means.

9. The improvement of claim 8 wherein said channel register means further comprise:
- channel status register means for storing a data count corresponding to a data block size to be transferred in the corresponding channel, and
- counter register means for storing a repeat count of the number of times an access operation is to be repeated in a corresponding channel to complete a corresponding channel program, wherein the contents of said channel status register means and said counter register means is initialized in accordance with said sequence of program instructions corresponding to said set up operation.

10. The improvement of claim 9 further comprising means for causing said DMA controller to relinquish access to said bus whenever one of:
- the amount of data transferred on said bus during said access operation equals the data count stored in said channel status register, and the access instruction has been executed repeatedly a number of times equal to said repeat count stored in said count register means.

11. The improvement of claim 8 wherein a central processing unit (CPU) is connected to said bus, said DMA controller further comprising:
   means for asserting a bus hold request to said CPU whenever said resolver means selects one of said I/O devices for access to said bus, and
   wherein said CPU comprises means for enabling said DMA controller to have access or permit the selected one I/O device to have access to said bus by transmitting a bus hold acknowledgment to said DMA controller.

12. The improvement of claim 11 further comprising:
   burst register means for storing a minimum amount of time that said DMA controller maintains access to said bus upon being enabled by said CPU to have access to said bus; and
   means for ignoring control signals from said CPU removing access to said bus from said DMA controller.

13. The improvement of claim 8 wherein one of said I/O devices comprises another DMA controller which is a slave to said DMA controller.

14. The improvement of claim 8 wherein said global register means further comprise:
   bandwidth register means for defining for each I/O device the amount of time that it is permitted to have access to said bus relative to the amount of time that it does not have access to said bus, and
   means for terminating the access of said one I/O device upon expiration of said amount of time,
   wherein the contents of said bandwidth register is initialized in accordance with said sequence of instructions corresponding to said set up operation.

* * * * *